US009568361B2

(12) United States Patent
Nakata et al.

(10) Patent No.: US 9,568,361 B2
(45) Date of Patent: Feb. 14, 2017

(54) OPTICAL SENSOR DEVICE

(71) Applicant: Rohm Co., Ltd., Kyoto (JP)

(72) Inventors: Yuichiro Nakata, Kyoto (JP); Yoshitsugu Uedaira, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/494,663

(22) Filed: Sep. 24, 2014

(65) Prior Publication Data
US 2015/0083915 A1 Mar. 26, 2015

(30) Foreign Application Priority Data

Sep. 26, 2013 (JP) ................. 2013-199203

(51) Int. Cl.
*G01J 5/00* (2006.01)
*G01J 1/44* (2006.01)
*G01J 1/16* (2006.01)

(52) U.S. Cl.
CPC ............... *G01J 1/44* (2013.01); *G01J 1/1626* (2013.01); *G01J 2001/446* (2013.01)

(58) Field of Classification Search
CPC ....... G01J 1/1626; G01J 1/44; G01J 2001/446
USPC ...................................... 250/338.1
See application file for complete search history.

(56) References Cited

U.S. PATENT DOCUMENTS

| 4,242,706 A * | 12/1980 | McCormack | H01L 27/14649 250/338.1 |
| 8,274,037 B2 * | 9/2012 | Ritter | G01J 1/46 250/214 A |
| 8,952,726 B2 * | 2/2015 | Yamazaki | G09G 3/20 257/59 |
| 9,018,583 B2 * | 4/2015 | Mocnik | G01N 15/0618 250/252.1 |
| 9,261,999 B2 * | 2/2016 | Jeong | G06F 3/0412 |
| 2003/0072495 A1 * | 4/2003 | Maki | H04N 1/4076 382/254 |
| 2005/0056842 A1 * | 3/2005 | Nishi | H01L 27/1214 257/66 |
| 2009/0294812 A1 * | 12/2009 | Gambino | H01L 27/14647 257/292 |
| 2010/0234077 A1 * | 9/2010 | Yoo | G06F 1/1626 455/566 |
| 2011/0007047 A1 * | 1/2011 | Fujioka | G02F 1/13338 345/207 |
| 2011/0054696 A1 * | 3/2011 | Olesen | G01M 5/0041 700/275 |
| 2011/0148835 A1 * | 6/2011 | Yamazaki | G02F 1/13318 345/207 |
| 2011/0248170 A1 * | 10/2011 | Holcombe | G01S 3/7803 250/340 |

(Continued)

FOREIGN PATENT DOCUMENTS

| JP | 2007-305868 | 11/2007 |
| JP | 2013-105963 | 5/2013 |

*Primary Examiner* — David J Makiya
*Assistant Examiner* — Taeho Jo
(74) *Attorney, Agent, or Firm* — Fish & Richardson P.C.

(57) ABSTRACT

An optical sensor device includes at least two light receiving units in which a plurality of types of light receiving elements is integrated in the same vertical structure. In addition, the optical sensor device further includes a switch unit configured to select at least one of the light receiving elements in each of the light receiving units in a time-division manner.

20 Claims, 15 Drawing Sheets

(56) References Cited

U.S. PATENT DOCUMENTS

| | | | | |
|---|---|---|---|---|
| 2011/0260629 A1* | 10/2011 | Uedaira | ............... | G01J 1/02 |
| | | | | 315/158 |
| 2012/0085890 A1* | 4/2012 | Kurokawa | ....... | H01L 27/14678 |
| | | | | 250/208.2 |
| 2012/0182277 A1* | 7/2012 | Jeong | ............... | G06F 3/0412 |
| | | | | 345/207 |
| 2012/0228505 A1* | 9/2012 | Han | ............. | H01L 27/14692 |
| | | | | 250/338.4 |
| 2012/0248452 A1* | 10/2012 | Yeo | .............. | G06F 3/0412 |
| | | | | 257/60 |
| 2013/0050068 A1* | 2/2013 | Inoue | ............... | G01J 1/4204 |
| | | | | 345/102 |
| 2013/0135257 A1* | 5/2013 | Lee | ................. | G06F 3/042 |
| | | | | 345/175 |
| 2014/0292658 A1* | 10/2014 | Lee | ............... | H03K 17/9629 |
| | | | | 345/168 |

\* cited by examiner

FIG. 5

| PHASE | SWa* | SWb* | SWc* | CURRENT PATH |
|---|---|---|---|---|
| a | ON | OFF | ON | |
| b | OFF | ON | ON | |
| c | — | — | OFF | |

OPTICAL SENSOR DEVICE

CROSS-REFERENCE TO RELATED APPLICATION

This application is based upon and claims the benefit of priority from Japanese Patent Application No. 2013-199203, filed on Sep. 26, 2013, the entire contents of which are incorporated herein by reference.

TECHNICAL FIELD

The present disclosure relates to an optical sensor device.

BACKGROUND

FIG. 15 is a block diagram illustrating an example of an optical sensor device in a related art. An optical sensor device 400 according to the related art measures intensity of light made incident on each of two types of photo diodes 401 and 402 having different light receiving characteristics (spectral sensitivity characteristics) and performs a comparison operation on respective measurement values S401 and S402 using a logic unit 405 to calculate intensity of illumination of the incident light or identify a source of the incident light.

However, in the optical sensor device 400 according to the example in the related art, since the two types of photo diodes 401 and 402 are independently formed on a semiconductor substrate, the light may not evenly reach both of the photo diodes 401 and 402 due to an incident angle of the light (deflection of the light occurs at a side where light reaches). In such a case, output ratios of the photo diodes 401 and 402 may deviate from each other, causing an error in the comparison operation of the logic unit 405 and deteriorating optical directivity characteristics of the optical sensor device 400.

SUMMARY

The present disclosure provides some embodiments of an optical sensor device having improved optical directivity characteristics.

According to one embodiment of the present disclosure, there is provided an optical sensor device, including at least two light receiving units in which a plurality of types of light receiving elements is integrated in the same vertical structure, and a switch unit configured to select at least one of the light receiving elements in each of the light receiving units in a time-division manner (first configuration).

Further, in the optical sensor device having the first configuration, the at least two light receiving units include at least one first light receiving unit and at least one second light receiving unit, wherein the at least one first light receiving unit includes a first light receiving element and a second light receiving element, light receiving characteristics of the second light receiving element being different from light receiving characteristics of the first light receiving element, wherein the at least one second light receiving unit includes a third light receiving element having light receiving characteristics identical to the light receiving characteristics of the first light receiving element and a fourth light receiving element having light receiving characteristics identical to the light receiving characteristics of the second light receiving element, and wherein the switch unit is configured to switch between a first phase, in which an output from the first light receiving element is selected as a first detection signal and an output from the fourth light receiving element is selected as a second detection signal, and a second phase, in which an output from the third light receiving element is selected as the first detection signal and an output from the second light receiving element is selected as the second detection signal, in a time-division manner (second configuration).

In addition, the optical sensor device having the second configuration further includes an analog/digital conversion (ADC) unit configured to convert the first detection signal and the second detection signal into a first digital signal and a second digital signal, respectively, wherein the switch unit is configured to switch between the first phase and the second phase in a time-division manner during a period in which the ADC unit performs a charging process (third configuration).

Also, in the optical sensor device having the third configuration, the switch unit is in a third phase in which an output is blocked when switching between the first phase and the second phase (fourth configuration).

Moreover, the optical sensor device having the third or fourth configuration further includes a logic unit configured to generate a sensor output signal based on the first digital signal and the second digital signal (fifth configuration).

Further, in the optical sensor device having one of the second to fifth configurations, the at least one first light receiving unit includes a plurality of first light receiving units and the at least one second light receiving unit includes a plurality of second light receiving units, and wherein the plurality of first light receiving units and the plurality of second light receiving units are installed in a zigzag pattern (sixth configuration).

Also, the optical sensor device having the first configuration further includes a logic unit configured to sequentially maintain in a register a signal which is output from each of the light receiving elements sequentially selected by the switch unit and to generate a sensor output signal based on the signal maintained in the register (seventh configuration).

According to another embodiment of the present disclosure, there is provided an optical sensor module, including an optical sensor device having one of the first to seventh configurations, and a case configured to hold therein the optical sensor device, wherein the optical sensor module is configured to detect a light incident on the optical sensor device from an opening window of the case (eighth configuration).

Further, the optical sensor module having the eighth configuration further includes a light emitting device, held within the case, configured to output an infrared light, wherein the optical sensor device further comprises an infrared light receiving unit configured to receive the infrared light reflected from an object adjacent to the optical sensor module after being output from the light emitting device (ninth configuration).

According to another embodiment of the present disclosure, there is provided an electronic apparatus, including an optical sensor device having one of the first to seventh configurations, or an optical sensor module having the eighth or ninth configuration (tenth configuration).

BRIEF DESCRIPTION OF THE DRAWINGS

FIG. 5 is a table for describing switching operations of the switch unit.

DETAILED DESCRIPTION

A first embodiment of the present disclosure will now be described in detail with reference to the drawings.

<First Embodiment>

Figure 1:
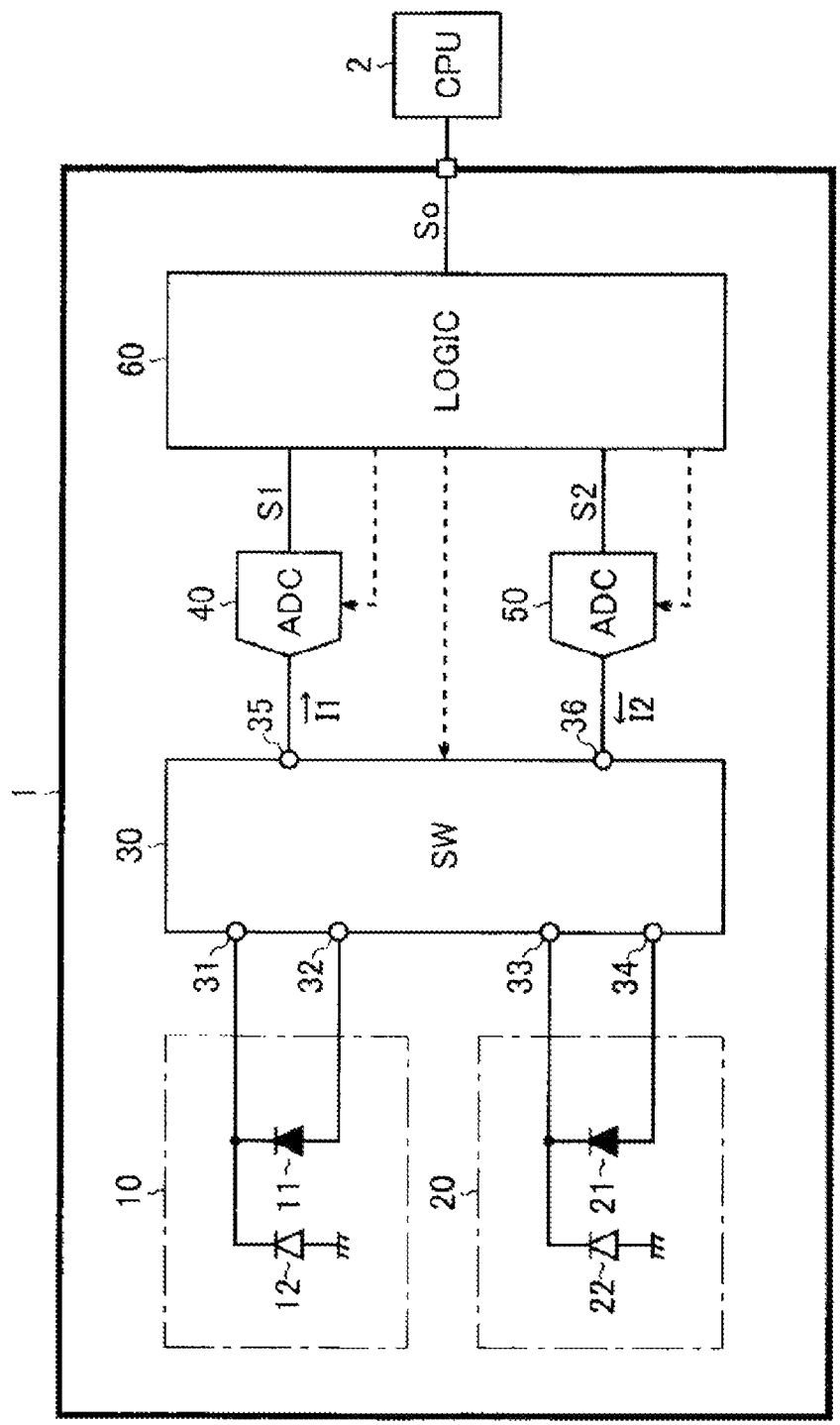
FIG. 1 is a block diagram illustrating an optical sensor device according to a first embodiment.

FIG. 1 is a block diagram illustrating an optical sensor device 1 according to a first embodiment. The optical sensor device 1 according to this embodiment is configured as a semiconductor integrated circuit (IC) device including light receiving units 10 and 20, a switch unit 30, analog/digital conversion (ADC) units 40 and 50, and a logic unit 60. For example, the optical sensor device 1 may serve as an illumination sensor for detecting intensity of illumination of ambient light and be incorporated into various electronic devices such as mobile phones (smart phones), digital cameras, television electronic devices, and the like.

The light receiving unit 10 is formed by integrating a photo diode 11 having maximum sensitivity (peak sensitivity) in a visible light wavelength range and a photo diode 12 having maximum sensitivity in an infrared light wavelength range in the same vertical structure. Both cathodes of the photo diodes 11 and 12 are connected to an input terminal 31 of the switch unit 30. An anode of the photo diode 11 is connected to an input terminal 32 of the switch unit 30. An anode of the photo diode 12 is connected to a ground terminal. Further, the vertical structure of the light receiving unit 10 will be described in detail below.

Like the light receiving unit 10, the light receiving unit 20 is formed by integrating a photo diode 21 having maximum sensitivity in a visible light wavelength range and a photo diode 22 having maximum sensitivity in an infrared light wavelength range in the same vertical structure. Both cathodes of the photo diodes 21 and 22 are connected to an input terminal 33 of the switch unit 30. An anode of the photo diode 21 is connected to an input terminal 34 of the switch unit 30. An anode of the photo diode 22 is connected to the ground terminal. Also, the vertical structure of the light receiving unit 20 will be described in detail below.

The switch unit 30 selects one of the photo diodes 11 and 12 and one of the photo diodes 21 and 22 in a time-division manner based on an instruction from the logic unit 60, and switches an internal current path to allow each optical current to flow to output terminals 35 and 36, as detection signals I1 and I2, respectively. Further, a configuration and an operation of the switch unit 30 will be described in detail below.

The ADC units 40 and 50 converts the detection signals I1 and I2 into digital signals S1 and S2 based on an instruction from the logic unit 60, respectively. For example, a dual-integration-type ADC circuit may be appropriately used as the ADC units 40 and 50.

The logic unit 60 performs a comparison operation on the digital signals S1 and S2 to generate and output a sensor output signal So to a central processing unit (CPU) 2. More specifically, the logic unit 60 generates the sensor output signal So by reducing the detection signal S2 (e.g., an average output of the photo diodes 12 and 22, details thereof will be described later) from the detection signal S1 (e.g., an average output of the photo diodes 11 and 21, details thereof will be described later) in a predetermined ratio. By performing such operation, light receiving characteristics (spectral sensitivity characteristics) of the overall optical sensor device 1 may be adjusted to a desired value without adding an optical filter, or the like, so that the intensity of illumination of ambient light (intensity of visible light component) may be accurately measured. However, the logic unit 60 is not limited to the above-described configuration but may be configured in different ways. For example, the logic unit 60 may not generate the sensor output signal So. In such a case, the digital signals S1 and S2 may be output to the CPU 2 and a subsequent signal processing may be performed by the CPU 2.

Figure 2:
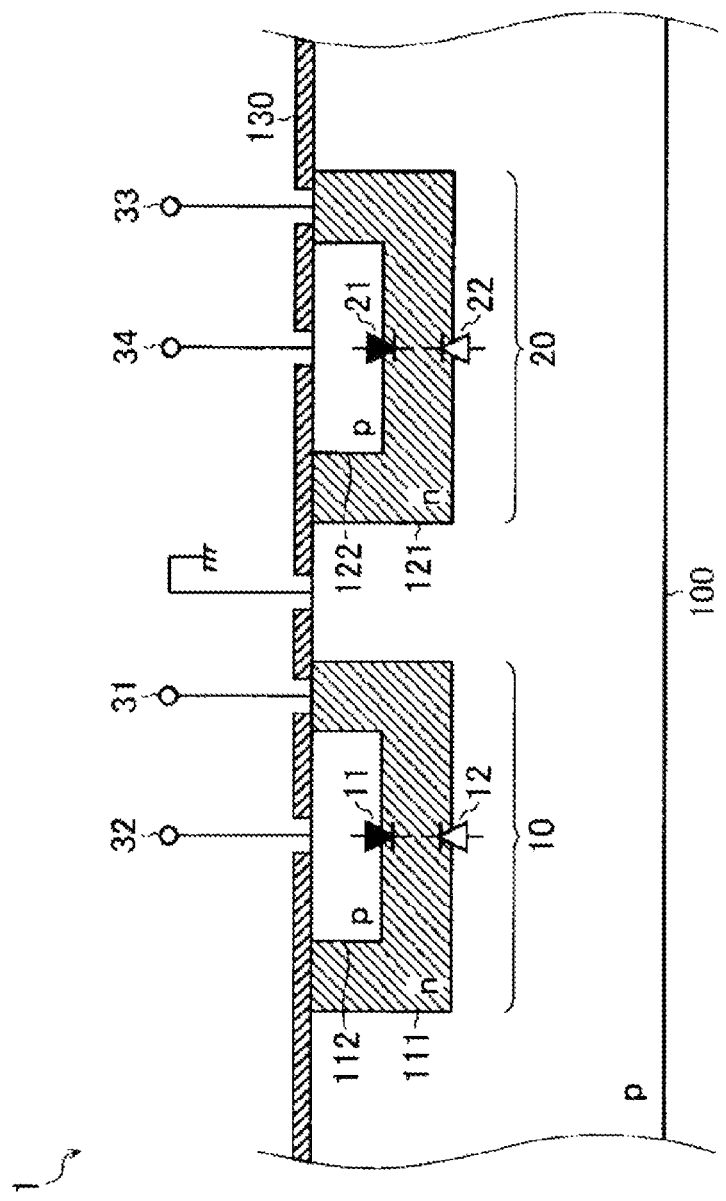
FIG. 2 is a cross-sectional view illustrating a vertical structure of the optical sensor device.

FIG. 2 is a cross-sectional view illustrating a vertical structure of the optical sensor device 1. In the optical sensor device 1 of this configuration, n-type wells 111 and 121 forming the light receiving units 10 and 20, respectively, are formed in a p-type substrate (semiconductor substrate) 100. Further, p-type wells 112 and 122 are additionally formed within the n-type wells 111 and 121, respectively.

Also, surfaces of the p-type substrate 100, the n-type wells 111 and 121, and the p-type wells 112 and 122 are coated with a transparent protective film 130, excluding a contact region for an electrical connection.

In the light receiving unit 10, the photo diode 11 is formed by a p-n junction interface between the p-type well 112 and the n-type well 111, and the photo diode 12 is formed by a p-n junction interface between the p-type substrate 100 and the n-type well 111. The n-type well 111 corresponding to the cathodes of the photo diodes 11 and 12 is connected to the input terminal 31 of the switch unit 30. The p-type well 112 corresponding to the anode of the photo diode 11 is connected to the input terminal 32 of the switch unit 30. The p-type substrate 100 corresponding to the anode of the photo diode 12 is connected to the ground terminal.

Similarly, in the light receiving unit 20, the photo diode 21 is formed by a p-n junction interface between the p-type well 122 and the n-type well 121, and the photo diode 22 is formed by a p-n junction interface between the p-type substrate 100 and the n-type well 121. The n-type well 121 corresponding to the cathodes of the photo diodes 21 and 22 is connected to the input terminal 33 of the switch unit 30. The p-type well 122 corresponding to the anode of the photo diode 21 is connected to the input terminal 34 of the switch unit 30. The p-type substrate 100 corresponding to the anode of the photo diode 22 is connected to the ground terminal.

Further, the both p-n junction interfaces respectively forming the photo diodes 11 and 21 are formed with a depth (depth from the surface of the p-type substrate 100, and the same below) at which the visible light (for example, light having a wavelength of 555 nm) is photo-electrically converted at the maximum efficiency. Meanwhile, the both p-n junction interfaces respectively forming the photo diodes 12 and 22 are formed with a depth at which the infrared light (for example, light having a wavelength of 850 nm) is photo-electrically converted at the maximum efficiency.

In the light receiving units 10 and 20 having the photo diode structure, as a wavelength of light incident from each light receiving surface (the surface of the semiconductor substrate 100) is getting shorter, the light may be absorbed in a position closer to the surface. Based on these characteristics, the photo diodes 11 and 21 having the maximum sensitivity in a visible light wavelength range can be formed at positions relatively close to the light receiving surface, and the photo diodes 12 and 22 having the maximum sensitivity in an infrared light wavelength range are formed at positions relatively far from the light receiving surface.

Figure 3:
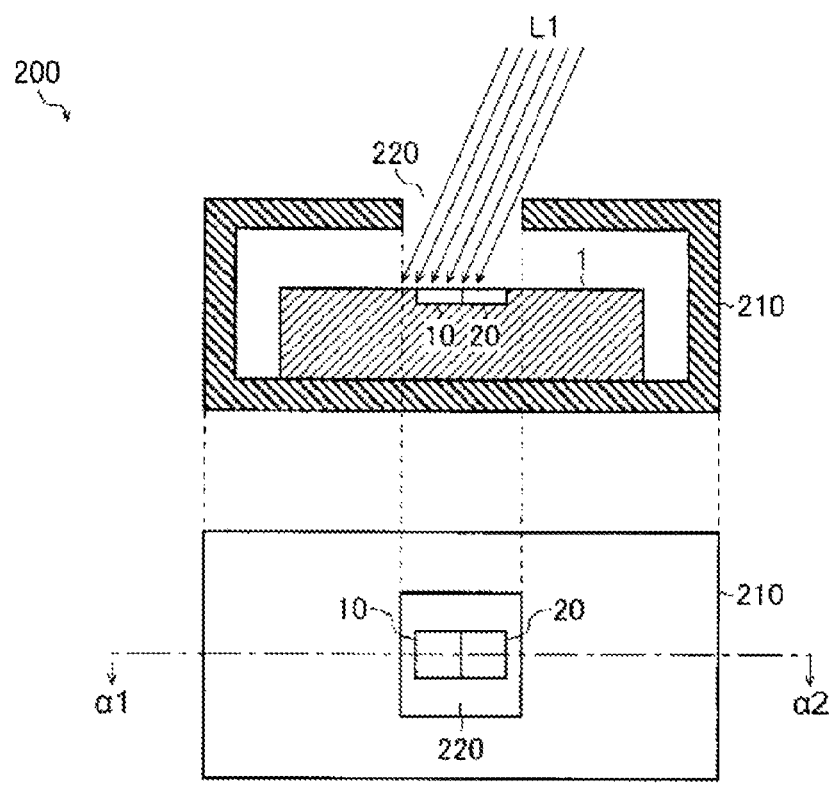
FIG. 3 is a schematic view illustrating an exemplary configuration of an optical sensor module equipped with the optical sensor device.

FIG. 3 is a schematic view illustrating an exemplary configuration of an optical sensor module 200 equipped with the optical sensor device 1. A plan view of the optical sensor module 200 is illustrated in a lower portion of FIG. 3, and a cross-sectional view of the optical sensor module 200 taken along line α1-α2 in a vertical direction is illustrated in an upper portion of FIG. 3.

The optical sensor module 200 according to this embodiment includes the optical sensor device 1 and a case 210 holding the optical sensor device 1, and detects ambient light L1 incident on the light receiving units 10 and 20 of the optical sensor device 1 from an opening window 220 of the case 210. The light receiving units 10 and 20 of the optical sensor device 1 are installed at positions adjacent to each other and immediately below the opening window 220.

However, although the light receiving units 10 and 20 are installed to be adjacent to each other to some extent, since the light receiving units 10 and 20 are independently formed on a semiconductor substrate, the ambient light L1 may not evenly reach both of the light receiving units 10 and 20 (deflection of light occurs at a side where the ambient light L1 reaches) based on an incident angle of the ambient light L1.

Thus, in order to prevent optical directivity characteristics of the optical sensor device 1 from being degraded even when the ambient light L1 does not evenly reach both the light receiving units 10 and 20, the optical sensor device 1 is alternately configured to switch light receiving characteristics (spectral sensitivity characteristics) of the light receiving units 10 and 20 using the switch unit 30 in a time-division manner. Hereinafter, a configuration and an operation of the switch unit 30 will be described in detail.

Figure 4:
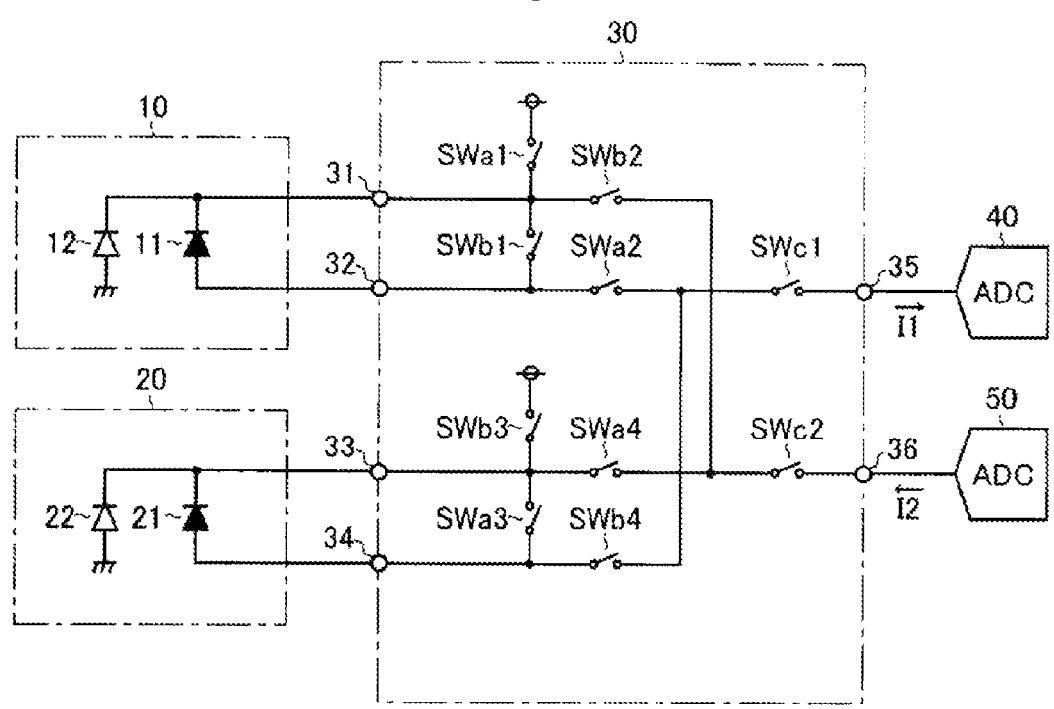
FIG. 4 is a circuit diagram illustrating an exemplary configuration of a switch unit.

FIG. 4 is a circuit diagram illustrating an exemplary configuration of the switch unit 30. The switch unit 30 according to this embodiment includes a plurality of switches SWa1 to SWa4, a plurality of switches SWb1 to SWb4, and a plurality of switches SWc1 and SWc2.

A first terminal of the switch SWa1 is connected to a power source terminal. A second terminal of the switch SWa1, a first terminal of the switch SWb1, and a first terminal of the switch SWb2 are all connected to the input terminal 31. Additionally, a second terminal of the switch SWb1 and a first terminal of the switch SWa2 are both connected to the input terminal 32. A first terminal of the switch SWb3 is connected to the power source terminal. A second terminal of the switch SWb3, a first terminal of the switch SWa3, and a first terminal of the switch SWa4 are all connected to the input terminal 33. Also, a second terminal of the switch SWa3 and a first terminal of the switch Swb4 are both connected to the input terminal 34. A second terminal of the switch SWa2 and a second terminal of the switch SWb4 are both connected to a first terminal of the switch SWc1. A second terminal of the switch SWb2 and a second terminal of the switch SWa4 are both connected to a first terminal of the switch SWc2. A second terminal of the switch SWc1 is connected to the output terminal 35. A second terminal of the switch SWc2 is connected to the output terminal 36.

Figure 5:
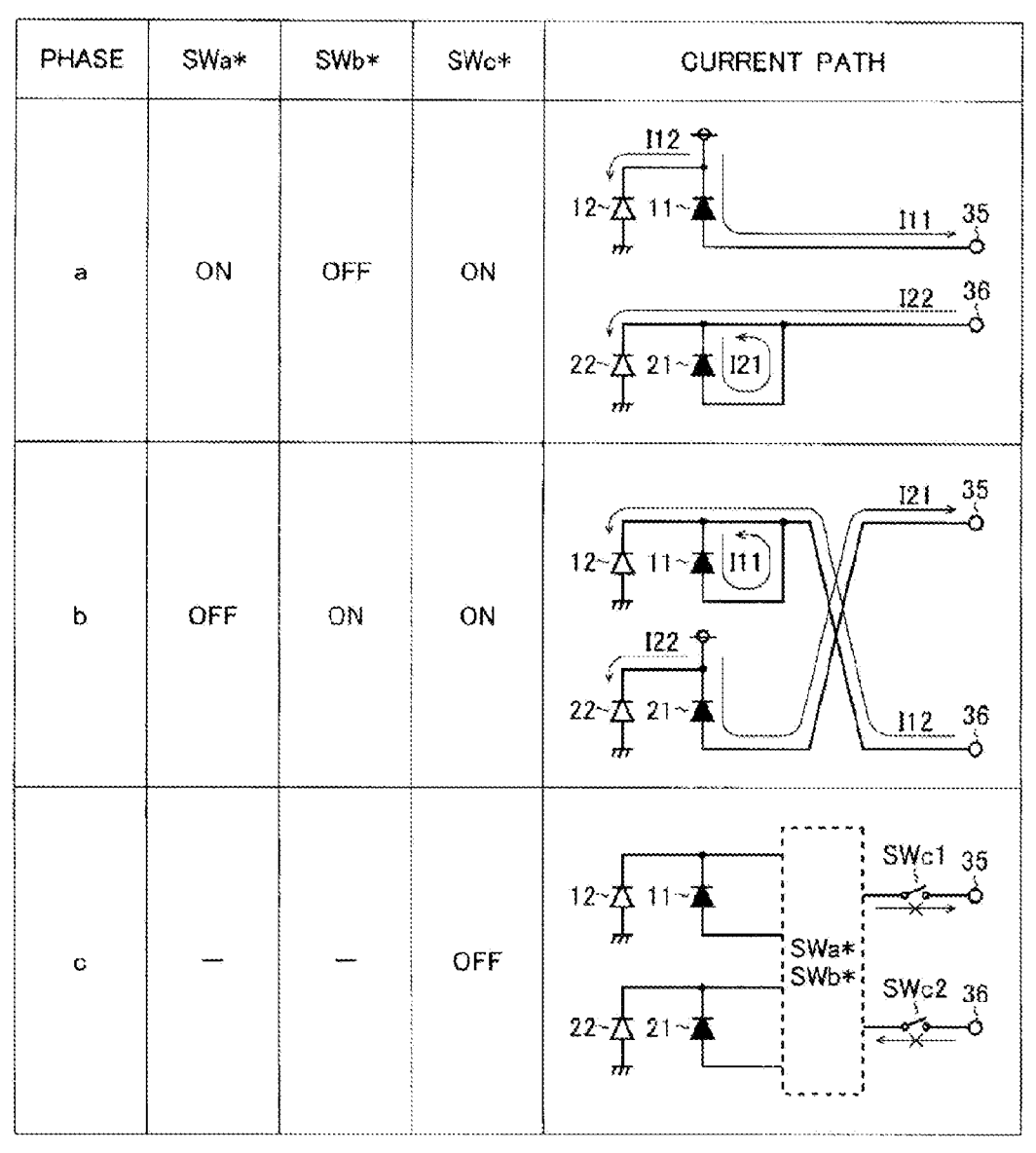

FIG. 5 is a table for describing switching operations of the switch unit 30, in which ON/OFF states of switches SWa* and SWb* (where *=1, 2, 3, 4), ON/OFF states of a switch SWc* (where *=1, 2), and current paths in the switch unit 30 in each of three phases a to c are illustrated.

In the phase a, the switches SWa* and SWc* are turned on but the switch SWb* is turned off. As a result, an optical current I11 generated in the photo diode 11 of the light receiving unit 10 flows from the power source terminal toward the output terminal 35, and an optical current I22 generated in the photo diode 22 of the light receiving unit 20 flows from the output terminal 36 toward the ground terminal.

Further, an optical current I12 generated in the photo diode 12 of the light receiving unit 10 flows from the power source terminal to the ground terminal, and thus, the optical current I12 is not output as a detection signal. Also, an optical current I21 generated in the photo diode 21 of the light receiving unit 20 circulates between the short-circuited anode and cathode of the photo diode 21, and thus, the optical current I21 is not output as a detection signal.

In this manner, in the phase a, a current path of the switch unit 30 is switched such that the optical current I11 is selected as the detection signal I1 and the optical current I22 is selected as the detection signal I2. That is, in the phase a, the light receiving unit 10 is in a state where the light receiving unit 10 is at the maximum sensitivity in the visible light wavelength range while the light receiving unit 20 is in a state where the light receiving unit 20 is at the maximum sensitivity in the infrared light wavelength range.

Meanwhile, in the phase b, the switches SWb* and SWc* are turned on but the switch SWa* is turned off. As a result, the optical current I21 generated in the photo diode 21 of the light receiving unit 20 flows from the power source terminal toward the output terminal 35, and the optical current I12 generated in the photo diode 12 of the light receiving unit 10 flows from the output terminal 36 toward the ground terminal.

Further, the optical current I22 generated in the photo diode 22 of the light receiving unit 20 flows from the power source terminal toward the ground terminal, and thus, the optical current I22 is not output as a detection signal. Also, the optical current I11 generated in the photo diode 11 of the light receiving unit 10 circulates between the short-circuited anode and cathode of the photo diode 11, and thus, the optical current I11 is not output as a detection signal.

In this manner, in the phase b, a current path of the switch unit 30 is switched such that the optical current I21 is selected as the detection signal I1 and the optical current I12 is selected as the detection signal I2. That is, contrary to the foregoing phase a, in the phase b, the light receiving unit 20 is in a state where the light receiving unit 20 is at the maximum sensitivity in the visible light wavelength range and the light receiving unit 10 is in a state where the light receiving unit 10 is at the maximum sensitivity in the infrared light wavelength range.

Figure 6:
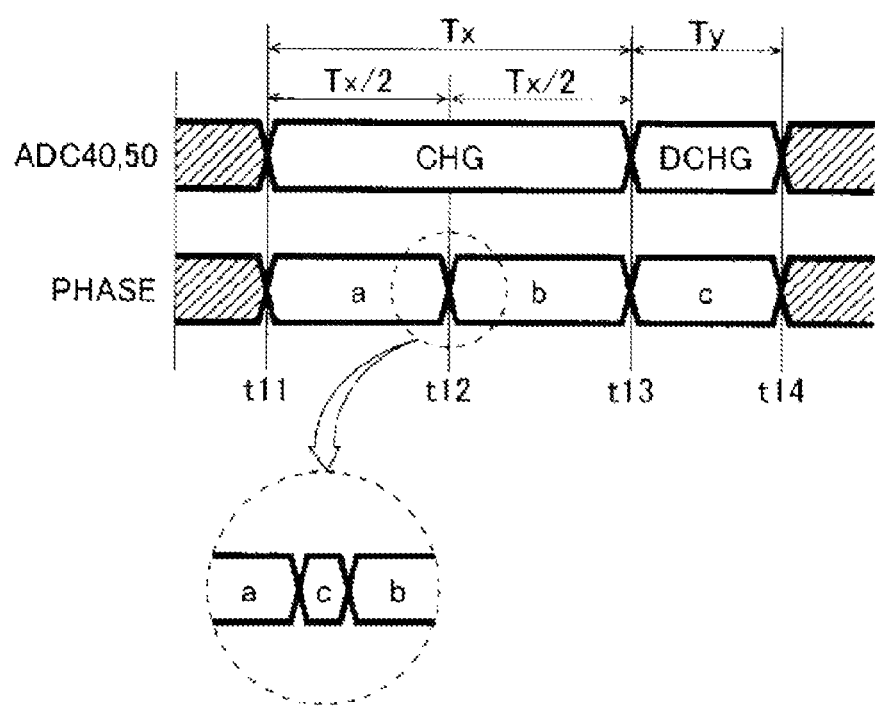
FIG. 6 is a timing chart illustrating a time-division light receiving operation according to a first example.

Further, in the phase c, the switch SWc* is turned off. As a result, the switch unit 30 is in a state in which an output is blocked (the output terminals 35 and 36 are in an open state). Also, in the phase c, the switches SWa* and SWb* may be turned either on or off, but, in this case, for example, both of them may be turned off FIG. 6 is a timing chart illustrating a time-division light receiving operation by the switch unit 30 according to a first example, in which operational states of the ADC units 40 and 50 are illustrated in an upper portion and a phase-switched state of the switch unit 30 is illustrated in a lower portion.

The dual-integration-type ADC units 40 and 50 perform a process of charging CHG on a capacitor (not shown) using the detection signals I1 and I2 during a predetermined charge period Tx (from time t11 to time t13, for example, 100 ms), starting from the time t11, and subsequently perform a process of discharging DCHG on the corresponding capacitor, starting from the time t13, and counts the length of the discharge period Ty (from time t13 to time t14) to convert the detection signals I1 and I2 into the digital signals S1 and S2.

At that time, the switch unit 30 switches between the foregoing phases a and b in a time-division manner during the charge period Tx of the ADC units 40 and 50. More specifically, the switch unit 30 is switched to the phase a during the first half (from time t11 to time t12) of the charge period Tx and switched to the phase b during the second half (from time t12 to time t13) of the charge period Tx. Also, during the discharge period Ty, the switch unit 30 may be switched to the phase c.

In the time-division light receiving operation as described above, the detection signal I1 is switched from the optical current I11 to the optical current I21 and the detection signal I2 is switched from the optical current I22 to the optical current I12 during the first half and the second half of the charge period Tx. Thus, the digital signal S1 obtained by converting the detection signal I1 may indicate a time average value of the optical current I11 and the optical current I21, and the digital signal S2 obtained by converting the detection signal I2 may indicate a time average value of the optical current I22 and the optical current I12.

That is, the light receiving characteristics (spectral sensitivity characteristics) of the light receiving units 10 and 20 are alternately switched in a time-division manner such that, during the first half of the charge period Tx, the light receiving unit 10 detects a visible light component of the ambient light L1 and the light receiving unit 20 detects an infrared light component thereof, while during the second half of the charge period Tx, on the contrary, the light receiving unit 10 detects an infrared light component of the ambient light L1 and the light receiving unit 20 detects a visible light component thereof. Thus, even when the ambient light L1 does not evenly reach both the light receiving units 10 and 20, output ratios of the detection signals I1 and I2 may hardly deviate from each other, thereby preventing optical directivity characteristics of the optical sensor device 1 being degraded.

Further, as illustrated in the enlarged view (see the broken line circle of FIG. 6) in the vicinity of the time t12, in some examples, the switch unit 30 may be in the phase c when the phase a is switched to the phase b. With this configuration, disturbance of the detection signals I1 and I2 that occurs when a phase is switched is not transmitted to the ADC units 40 and 50, and thus, precision of the digital signals S1 and S2 (further, the sensor output signal So) may be increased.

Also, in this embodiment, the above-described configuration in which two types of light receiving elements are integrated in each of the light receiving units is taken as an example, but the number of the light receiving elements of each of the light receiving units is not limited thereto. For example, three or more types of the light receiving elements may be integrated in each of the light receiving units. In this case, ADC units corresponding to the number of the light receiving elements may be installed in each of the light receiving units and the respective detection signals may be processed in parallel.

<Second Embodiment>

Figure 7:
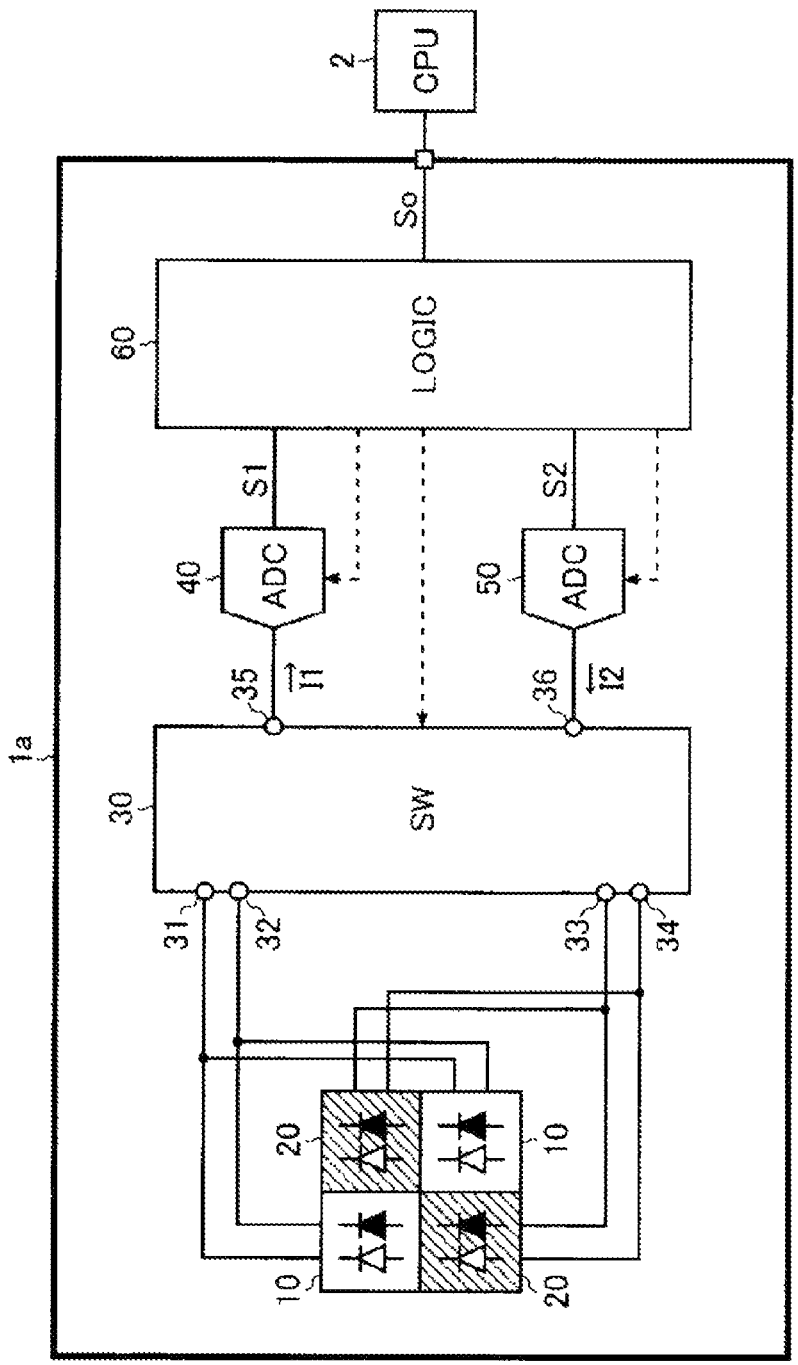
FIG. 7 is a block diagram illustrating an optical sensor device according to a second embodiment.

FIG. 7 is a block diagram illustrating an optical sensor device 1a according to a second embodiment. The optical sensor device 1a according to this embodiment generally includes the same components as those of the first embodiment (see FIG. 1). In addition, the optical sensor device 1a according to this embodiment is configured such that a plurality of light receiving units 10 and a plurality of light receiving units 20 are installed in a zigzag pattern. Further, all of the light receiving units 10 are connected in parallel to the input terminals 31 and 32 of the switch unit 30. Also, all of the light receiving units 20 are connected in parallel to the input terminals 33 and 34 of the switch unit 30.

With such configuration, for example, even when an incident angle of the ambient light L1 is changed within a period of time shorter than the charge period Tx, a sensor output signal So with high precision may be generated by averaging outputs obtained from the light receiving units 10 and the light receiving units 20.

<Third Embodiment>

Figure 8:
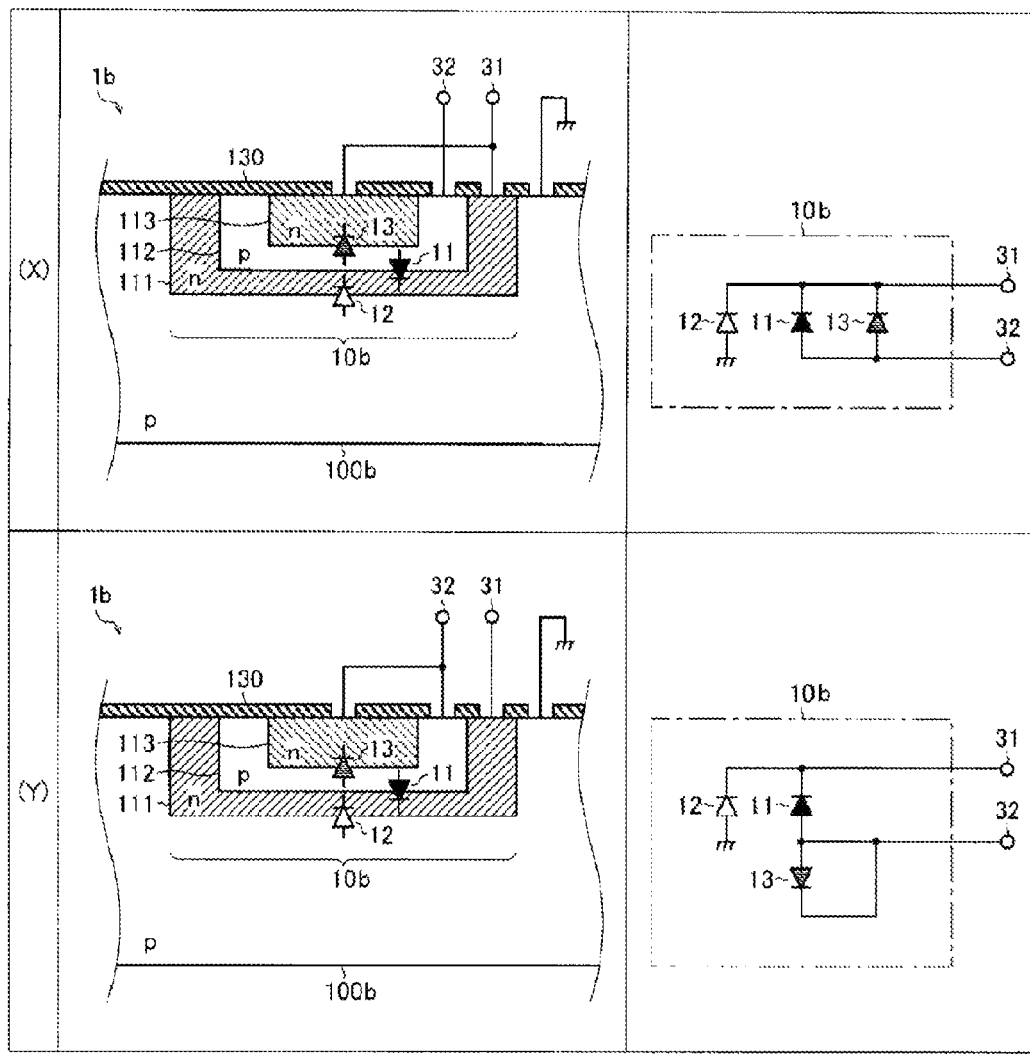
FIG. 8 is a table illustrating operations of an optical sensor device according to a third embodiment.

FIG. 8 is a table illustrating operations of an optical sensor device 1b according to a third embodiment. As shown in FIG. 8, vertical structures of the light receiving unit 10b are illustrated on the left and equivalent circuit diagrams of the light receiving unit 10b are illustrated on the right. Also, vertical structures and equivalent circuit diagrams of the light receiving unit 20 are identical to those of the light receiving unit 10b, and therefore, a repeated description thereof will be omitted.

In the optical sensor device 1b of this embodiment, an n-type well 113 is additionally formed within the p-type well 112, and a photo diode 13 having light receiving characteristics (spectral sensitivity characteristics) different from those of the photo diodes 11 and 12 as described above is newly formed by a p-n junction interface between the p-type well 112 and the n-type well 113 in the light receiving unit 10b.

Further, the n-type well 113 corresponding to a cathode of the photo diode 13 may be connected to the input terminal 31 of the switch unit 30 (see the section (X)) or may be connected to the input terminal 32 of the switch unit 30 (see the section (Y)).

Also in case of employing the configuration of the section (X), since the photo diode 13 is connected to the photo diode 11 in parallel, optical currents of the photo diodes 11 and 13 are added to be output. Meanwhile, in case of employing the configuration of the section (Y), since the anode and cathode of the photo diode 13 are short-circuited with each other, an optical current of the photo diode 13 is not output.

<Fourth Embodiment>

Figure 9:
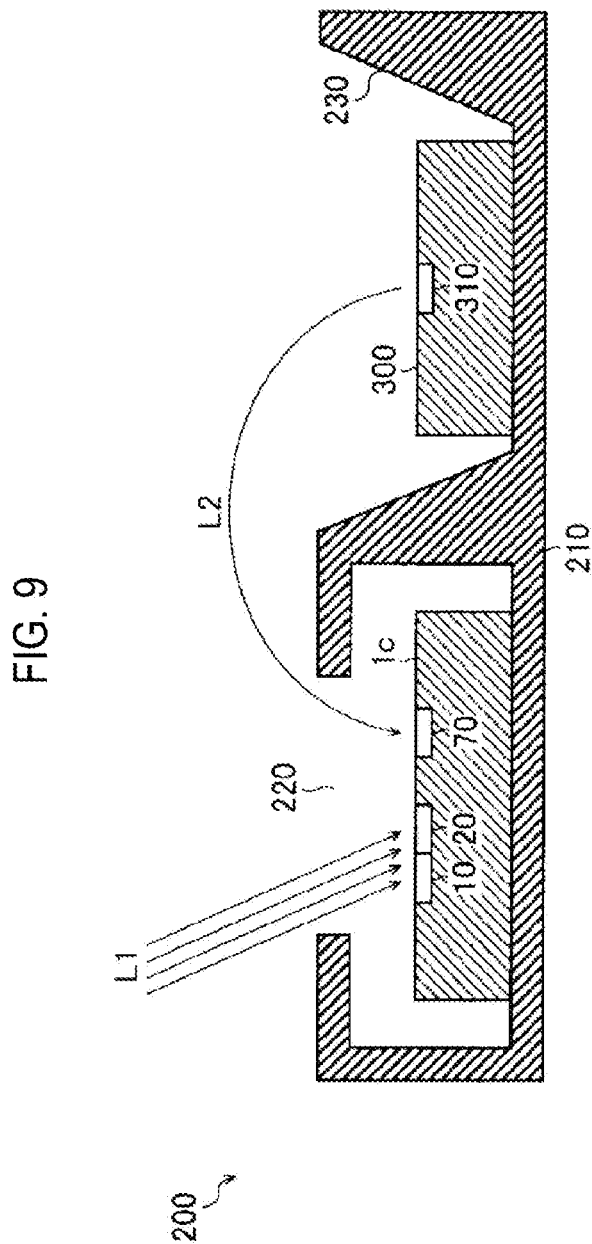
FIG. 9 is a schematic view illustrating an optical sensor module according to a fourth embodiment.

FIG. 9 is a schematic view illustrating an optical sensor module 200 according to a fourth embodiment. The optical sensor module 200 is equipped with an optical sensor device 1c that basically has the same configuration as that illustrated in FIG. 3 described above. In addition, the optical sensor module 200 includes a light emitting device 300 held in a case 210 for outputting an infrared light L2 from a light emitting unit 310. Further, a tapered surface 230 is installed to surround the periphery of the light emitting device 300 in the case 210, and may allow the infrared light L2 to be effectively output.

In addition, the optical sensor device 1c according to this embodiment further includes an infrared light receiving unit 70 for receiving the infrared light L2 reflected from an object (not shown) adjacent to the optical sensor module 200 after being output from the light emitting device 300. Also, the infrared light receiving unit 70 basically has the same vertical structure (see FIG. 2) as that of the foregoing light receiving unit 10 (or 20). In some examples, since the infrared light receiving unit 70 is configured to selectively receive only the infrared light L2, the anode and the cathode of the photo diode 11 are short-circuited, and an infrared filter for allowing only the infrared light L2 to be transmitted therethrough is formed on a surface of the semiconductor substrate 100.

The optical sensor module 200 employing this configuration may also be used as a proximity sensor for determining whether the infrared light L2 is reflected and detects an approaching object, as well as used as an illumination sensor for detecting the intensity of illumination of the ambient light L1.

Further, in the optical sensor device 1c according to this embodiment, the above-described configuration in which the infrared light receiving unit 70 is installed in addition to the light receiving units 10 and 20 is taken as an example, but not limited thereto. For example, the detection of the infrared light L2 may be performed by utilizing the light receiving units 10 and 20. In this case, the switch unit 30 may be controlled so as to detect the ambient light L1 and the infrared light L2 in a time-division manner. With this configuration, since the infrared light receiving unit 70 is not installed in the optical sensor device 1c, the optical sensor device 1c may be miniaturized while incurring low cost.

Also, in the case of detecting the infrared light L2 using the light receiving units 10 and 20, an operation by the logic unit 60 may be appropriately changed in synchronization with the switch between the detection of the ambient light L1 and the infrared light L2. Specifically, in case of detecting the ambient light L1, the sensor output signal So may be generated by reducing the detection signal S2 (e.g., average output of the photo diodes 12 and 22) from the detection signal S1 (e.g., average output of the photo diodes 11 and 21) in a predetermined ratio such that the intensity of illumination (intensity of a visible light component) of the ambient light L1 is accurately measured. Meanwhile, conversely, in case of detecting the infrared light L2, the sensor output signal So may be generated by reducing the detection signal S1 from the detection signal S2 in a predetermined ratio such that the reflection of the infrared light L2 is accurately measured.

<Fifth Embodiment>

Figure 10:
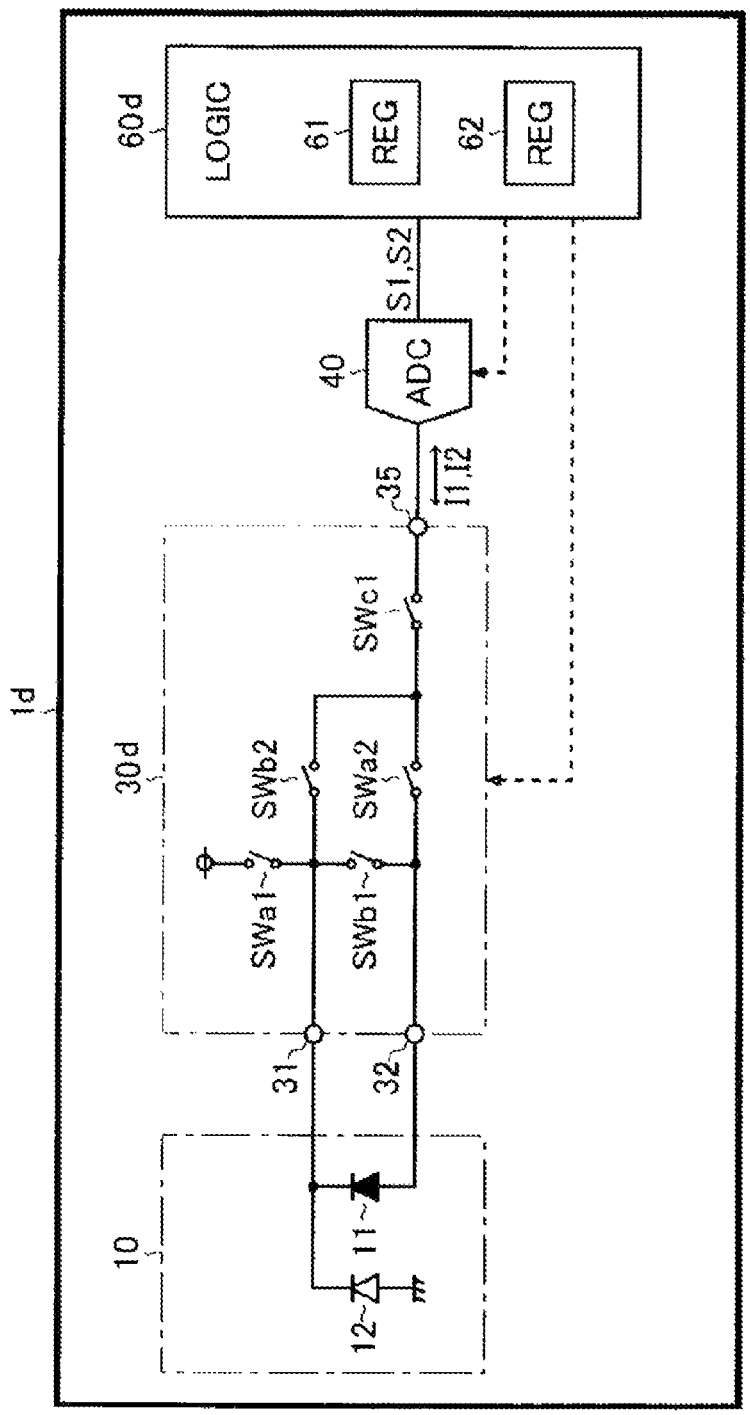
FIG. 10 is a block diagram illustrating an optical sensor device according to a fifth embodiment.

FIG. 10 is a block diagram illustrating the optical sensor device 1d according to a fifth embodiment. The optical sensor device 1d according to this embodiment generally includes the same components as those of the first embodiment (see FIG. 1). In addition, in the optical sensor device 1d according to this embodiment, both the light receiving unit 20 and the ADC unit 50 are omitted.

Further, with those components omitted, the configuration of a switch unit 30d is also altered from that of the first embodiment. Specifically, in the switch unit 30d, the input terminals 33 and 34, the output terminal 36, the switches SWa3 and SWa4, the switches SWb3 and SWb4, and the switch SWc2 are omitted from the switch unit 30 of the first embodiment, and a second terminal of the switch SWb2 is connected to a first terminal of the switch SWc1. Also, ON/OFF states of the respective switches (the switches not omitted in this embodiment) in the phases a to c are identical to those shown in FIG. 5 in the phases a to c, and thus, a repeated description thereof will be omitted.

Further, with those components omitted, the logic unit 60 is altered to a logic unit 60d for sequentially maintaining the digital signals S1 and S2 input in a time-division manner in registers 61 and 62 and generating the sensor output signal So based on the signals maintained in the registers 61 and 62, rather than as a component for generating the sensor output signal So by processing the digital signals S1 and S2 in parallel.

Figure 11:
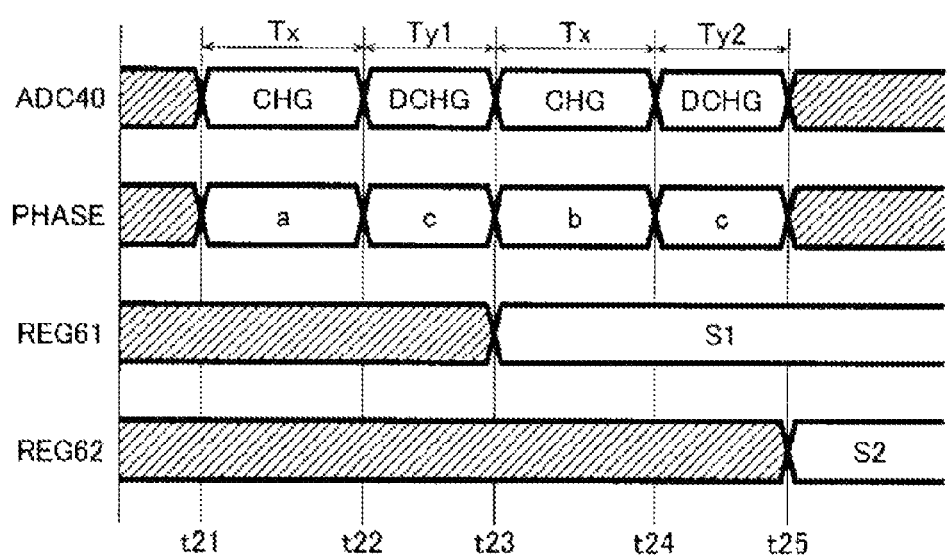
FIG. 11 is a timing chart illustrating a time-division light receiving operation according to a second example.

FIG. 11 is a timing chart illustrating a time-division light receiving operation by the switch unit 30d according to a second example. In FIG. 11, an operational state of the ADC unit 40, a phase switch state of the switch unit 30d, and the storage state of the registers 61 and 62 are illustrated in order downwards.

First, the switch unit 30d is switched to a phase a during a predetermined charge period Tx (from times t21 to t22, for example, 100 ms), starting from a time t21, and outputs an optical current I11 as a detection signal I1. Meanwhile, the ADC unit 40 performs a process of charging CHG on a capacitor (not shown) using the detection signal I1 during the predetermined charge period Tx, and subsequently performs a process of discharging DCHG on the corresponding capacitor, starting from the time t22, and counts the length of the discharge period Ty1 (from time t22 to time t23) to convert the detection signal I1 into a digital signal S1. The digital signal S1 is stored in the register 61 after the time t23. Also, during the discharge period Ty1, the switch unit 30d may remain in the phase c.

Next, the switch unit 30d is switched to the phase b during the predetermined period of time Tx (from time t23 to time t24, for example, 100 ms), starting from the time t23, and outputs an optical current I12 as a detection signal I2. Meanwhile, the ADC unit 40 performs a process of charging CHG on a capacitor (not shown) by the detection signal I2 during the charge period Tx, and subsequently performs a process of discharging DCHG on the corresponding capacitor, starting from the time t24, and counts a length of the discharge period Ty2 (from the time t24 to time t25) to convert the detection signal I2 into a digital signal S2. The digital signal S2 is stored in the register 61 after the time t25. Also, during the discharge period Ty2, the switch unit 30d may remain in the phase c.

At the time t25, both of the digital signals S1 and S2 are stored in the registers 61 and 62, and thereafter, the logic unit 60d may read the digital signals S1 and S2 from the registers 61 and 62 to generate a sensor output signal So. Also, since the operation of the logic unit 60d is the same as that described above, a repeated description thereof will be omitted.

As described above, the optical sensor device 1d according to this embodiment generates the sensor output signal So based on the digital signals S1 and S2 obtained by sequentially switching the maximum sensitivity of the light receiving unit 10 between the visible light wavelength range and the infrared light wavelength range. With this configuration of detecting the ambient light L1 using the single light receiving unit 10 that may be able to arbitrarily switch the light receiving characteristics (spectral sensitivity characteristics), since output ratios of the photo diodes 11 and 12 may be uniformly maintained without relying on an incident angle of the ambient light L1, optical directivity characteristics of the optical sensor device 1d may be enhanced. Further, compared to the first embodiment (see FIG. 1) using the plurality of light receiving units 10 and 20, the optical sensor device 1d may be reduced in size while incurring low cost.

In some examples, the optical sensor device 1d according to this embodiment may require a time for generating and processing the sensor output signal So, compared with the first embodiment capable of generating the digital signal S1 and S2 in parallel (see FIGS. 6 and 11).

<Electronic Apparatus>

Figure 12:
FIG. 12 is an external appearance view of a mobile phone (smart phone).
Figure 13:
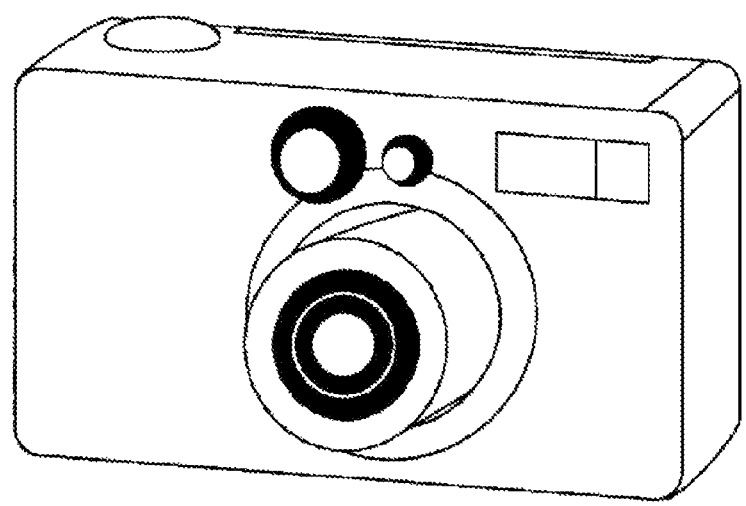
FIG. 13 is an external appearance view of a digital camera.
Figure 14:
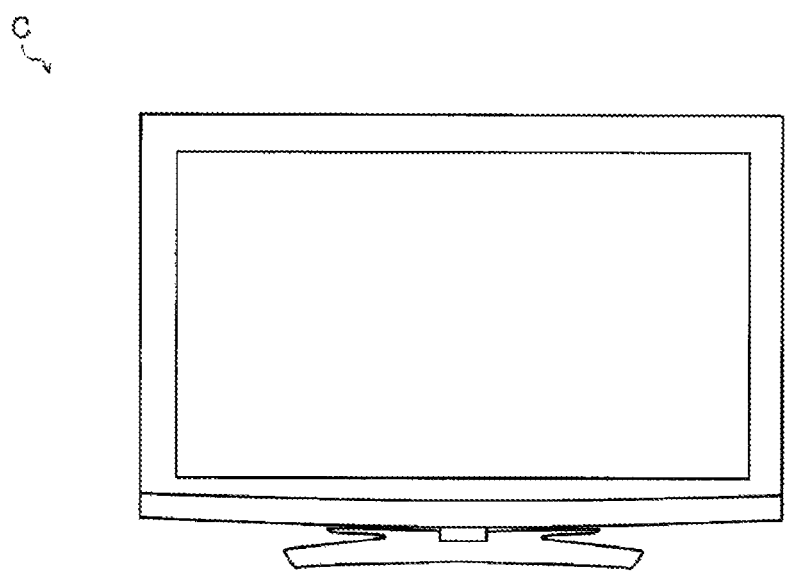
FIG. 14 is an external appearance view of a TV.
Figure 15:
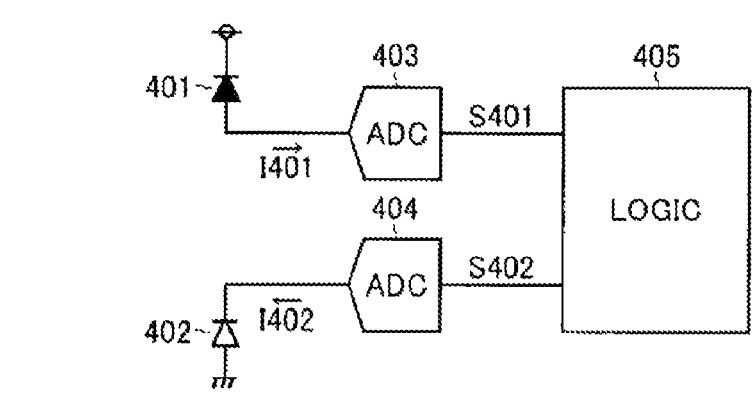
FIG. 15 is a block diagram illustrating an example of an optical sensor device in a related art.

FIGS. 12 to 14 are external appearance views of electronic apparatuses A to C such as a mobile phones (smart phone), a digital camera, and a TV) equipped with the optical sensor device 1. In the electronic apparatuses A to C, for example, the foregoing optical sensor device 1 may be incorporated as an illumination sensor to control backlight of a display unit based on intensity of illumination of ambient light.

<Other Modified Examples>

Further, in the foregoing embodiment, the application example as an illumination sensor has been mainly described, but the present disclosure is not limited thereto and may be widely applied to a proximity sensor, a color sensor, and ultraviolet (UV) sensor, and the like for example, in addition to the illumination sensor.

According to the present disclosure in some embodiments, it is possible to provide an optical sensor device having improved optical directivity characteristics.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An optical sensor device, comprising:
a first light receiving unit in which a first light receiving element of a first type and a second light receiving element of a second type are integrated in a vertical structure;
a second light receiving unit in which a third light receiving element of the first type and a fourth light receiving element of the second type are integrated in the same vertical structure; and
a switch unit configured to switch between a first phase, a second phase, and a third phase between the first phase and the second phase in a time-division manner, the switch unit selecting in the first phase the first light receiving element from the first light receiving unit as a first detection signal and the fourth light receiving element from the second light receiving unit as a second detection signal simultaneously, selecting in the second phase the second light receiving element from the first light receiving unit as the second detection signal and the third light receiving element from the second light receiving unit as the first detection signal simultaneously, and blocking in the third phase an output of the first light receiving unit and an output of the second light receiving unit.

2. The optical sensor device of claim 1, further comprising:
a first analog/digital conversion (ADC) unit configured to convert the first detection signal into a first digital signal; and
a second analog/digital conversion (ADC) unit configured to convert the second detection signal into a second digital signal.

3. The optical sensor device of claim 2 further comprising a logic unit configured to generate a sensor output signal based on the first digital signal and the second digital signal.

4. The optical sensor device of claim 2, wherein both of the first analog/digital conversion (ADC) unit and the second analog/digital conversion (ADC) unit perform the converting operation in both of the first phase and the second phase.

5. The optical sensor device of claim 4, wherein the first analog/digital conversion (ADC) unit and the second analog/digital conversion (ADC) unit perform the converting operation simultaneously.

6. The optical sensor device of claim 1, wherein the first light receiving unit includes a plurality of first light receiving units and the second light receiving unit includes a plurality of second light receiving units, and
wherein the plurality of first light receiving units and the plurality of second light receiving units are installed in a zigzag pattern.

7. The optical sensor device of claim 1, further comprising a logic unit configured to sequentially maintain in a register a signal which is output from each of the light receiving elements sequentially selected by the switch unit and to generate a sensor output signal based on the signal maintained in the register.

8. An optical sensor module, comprising:
an optical sensor device of claim 1; and
a case configured to hold therein the optical sensor device,
wherein the optical sensor module is configured to detect a light incident on the optical sensor device from an opening window of the case.

9. The optical sensor module of claim 8, further comprising a light emitting device, held within the case, configured to output an infrared light,
wherein the optical sensor device further comprises an infrared light receiving unit configured to receive the infrared light reflected from an object adjacent to the optical sensor module after being output from the light emitting device.

10. An electronic apparatus, comprising:
an optical sensor device of claim 1.

11. The optical sensor device of claim 1, further comprising:
a first input terminal of the switch unit configured to receive a first light receiving signal from the first light receiving element of the first light receiving unit;
a second input terminal of the switch unit configured to receive a second light receiving signal from the first light receiving element of the first light receiving unit;
a third input terminal of the switch unit configured to receive a third light receiving signal from the third light receiving element of the second light receiving unit;
a fourth input terminal of the switch unit configured to receive a fourth light receiving signal from the first light receiving element of the second light receiving unit;
a first output terminal of the switch unit configured to output the first detection signal from the first input terminal in the first phase and from the third input terminal in the second phase; and a second output terminal of the switch unit configured to output the second detection signal from the fourth input terminal in the first phase and from the second input terminal in the second phase.

12. The optical sensor device of claim 11, further comprising:

a first switch in the switch unit including a first terminal connected to a power source terminal and a second terminal connected to the second input terminal;

a second switch in the switch unit including a first terminal connected to the first input terminal and a second terminal connected to the first output terminal;

a third switch in the switch unit including a first terminal connected to the third input terminal and a second terminal connected to the fourth input terminal;

a fourth switch in the switch unit including a first terminal connected to the fourth input terminal and a second terminal connected to the second output terminal;

a fifth switch in the switch unit including a first terminal connected to the first input terminal and a second terminal connected to the second input terminal;

a sixth switch in the switch unit including a first terminal connected to the second input terminal and a second terminal connected to the second output terminal;

a seventh switch in the switch unit including a first terminal connected to a power source terminal and a second terminal connected to the fourth input terminal; and an eighth switch in the switch unit including a first terminal connected to the third input terminal and a second terminal connected to the first output terminal.

13. The optical sensor device of claim 12, wherein the first light receiving unit includes an anode of the first light receiving element connected to the first input terminal, a cathode of the first light receiving element and a cathode of the second light receiving element connected to the second input terminal, and an anode of the first light receiving element connected to a ground terminal, and wherein the second light receiving unit includes an anode of the third light receiving element connected to the third input terminal, a cathode of the third light receiving element and a cathode of the fourth light receiving element connected to the fourth input terminal, and an anode of the fourth light receiving element connected to a ground terminal.

14. The optical sensor device of claim 12, wherein in the first phase, the first switch, the second switch, the third switch and the fourth switch are closed, and the fifth switch, the sixth switch, the seventh switch and the eighth switch are open so as to select the first light receiving element as the first detection signal and the fourth light receiving element as the second detection signal simultaneously; and wherein in the second phase, the first switch, the second switch, the third switch and the fourth are open, and the fifth switch, the sixth switch, the seventh switch and the eighth switch are closed so as to select the third light receiving element as the first detection signal and the second light receiving element as the second detection signal simultaneously.

15. The optical sensor device of claim 12, further comprising:

a ninth switch in the switch unit including a first terminal connected to the second terminal of the second switch and the second terminal of the eighth switch, and a second terminal connected to the first output terminal; and a tenth switch in the switch unit including a first terminal connected to the second terminal of the fourth switch and the second terminal of the sixed switch, and a second terminal connected to the second output terminal, wherein in the third phase, the ninth switch and the tenth switch are open so as to block the output of the first detection signal from being transmitted to the first ADC unit and the output of the second detection signal from being transmitted to the second ADC unit.

16. An optical sensor device, comprising:

a first light receiving unit in which a first light receiving element of a first type and a second light receiving element of a second type are integrated in a vertical structure;

a second light receiving unit in which a third light receiving element of the first type and a fourth light receiving element of the second type are integrated in the same vertical structure; and a switch unit including a first input terminal which is configured to receive a first light receiving signal from the first light receiving element of the first light receiving unit, a second input terminal which is configured to receive a second light receiving signal from the first light receiving element of the first light receiving unit, a third input terminal which is configured to receive a third light receiving signal from the third light receiving element of the second light receiving unit, a fourth input terminal of the switch unit which is configured to receive a fourth light receiving signal from the first light receiving element of the second light receiving unit, a first output terminal which is configured to output a first detection signal, and a second output terminal which is configured to output a second detection signal;

wherein the switch unit including a first switch including a first terminal connected to a power source terminal and a second terminal connected to the second input terminal, a second switch including a first terminal connected to the first input terminal and a second terminal connected to the first output terminal, a third switch including a first terminal connected to the third input terminal and a second terminal connected to the fourth input terminal, a fourth switch including a first terminal connected to the fourth input terminal and a second terminal connected to the second output terminal, a fifth switch including a first terminal connected to the first input terminal and a second terminal connected to the second input terminal, a sixth switch including a first terminal connected to the second input terminal and a second terminal connected to the second output terminal, a seventh switch including a first terminal connected to a power source terminal and a second terminal connected to the fourth input terminal, and an eighth switch including a first terminal connected to the third input terminal and a second terminal connected to the first output terminal, and wherein the switch unit is configured to switch between a first phase, a second phase in a time-division manner, the switch unit selecting in the first phase the first light receiving element from the first light receiving unit as the first detection signal and the fourth light receiving element from the second light receiving unit as the second detection signal simultaneously by closing the first switch, the second switch, the third switch and the fourth switch and opening the fifth switch, the sixth switch, the seventh switch and the eighth switch, and selecting in the second phase the second light receiving element from the first light receiving unit as the second detection signal and the third light receiving element from the second light receiving unit as the first detection signal simultaneously by opening the first switch, the second switch, the third switch and the fourth and closing the fifth switch, the sixth switch, the seventh switch and the eighth switch.

17. The optical sensor device of claim 16, further comprising:
a first analog/digital conversion (ADC) unit configured to convert the first detection signal into a first digital signal; and
a second analog/digital conversion (ADC) unit configured to convert the second detection signal into a second digital signal.

18. The optical sensor device of claim 17, further comprising:
a ninth switch in the switch unit including a first terminal connected to the second terminal of the second switch and the second terminal of the eighth switch, and a second terminal connected to the first output terminal; and
a tenth switch in the switch unit including a first terminal connected to the second terminal of the fourth switch and the second terminal of the sixed switch, and a second terminal connected to the second output terminal,
wherein in the third phase the ninth switch and the tenth switch are open so as to block the output of the first detection signal from transmitting to the first ADC unit and the output of the second detection signal from transmitting to the second ADC unit.

19. The optical sensor device of claim 16,
wherein the first light receiving unit includes an anode of the first light receiving element connected to the first input terminal, a cathode of the first light receiving element and a cathode of the second light receiving element connected to the second input terminal, and an anode of the first light receiving element connected to a ground terminal, and
wherein the second light receiving unit includes an anode of the third light receiving element connected to the third input terminal, a cathode of the third light receiving element and a cathode of the fourth light receiving element connected to the fourth input terminal, and an anode of the fourth light receiving element connected to a ground terminal.

20. The optical sensor device of claim 16, wherein the switch unit is in a third phase in which an output from the first receiving unit and an output of the second receiving unit are both blocked when switching between the first phase and the second phase.

* * * * *